(12) United States Patent
Fischer et al.

(10) Patent No.: US 8,973,998 B2
(45) Date of Patent: Mar. 10, 2015

(54) VEHICLE SEAT, IN PARTICULAR MOTOR VEHICLE SEAT

(75) Inventors: Georg Fischer, Winnweiler (DE); Volker Schaefer, Otterbach (DE); Elfriede Monika Schaefer, legal representative, Kaiserslautern (DE); Günter Franzmann, Rockenhausen (DE); Werner Liborius, Niedermohr (DE); Lars Kramm, Trippstadt (DE); Harald Wolsiefer, Krickenbach (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 291 days.

(21) Appl. No.: 13/513,899

(22) PCT Filed: Nov. 25, 2010

(86) PCT No.: PCT/EP2010/007160
§ 371 (c)(1),
(2), (4) Date: Nov. 9, 2012

(87) PCT Pub. No.: WO2011/069604
PCT Pub. Date: Jun. 16, 2011

(65) Prior Publication Data
US 2013/0049434 A1 Feb. 28, 2013

(30) Foreign Application Priority Data
Dec. 9, 2009 (DE) .................. 10 2009 057 928

(51) Int. Cl.
*B60N 2/20* (2006.01)
*B60N 2/22* (2006.01)
(Continued)

(52) U.S. Cl.
CPC *B60N 2/22* (2013.01); *B60N 2/225* (2013.01); *B60N 2/235* (2013.01); *B60N 2/682* (2013.01)

USPC .......................................... 297/361.1

(58) Field of Classification Search
USPC ............ 297/361.1, 362, 362.11–362.14, 366, 297/367 R, 378.1
See application file for complete search history.

(56) References Cited

U.S. PATENT DOCUMENTS

| 2,460,721 | A | 2/1949 | Thompson |
| 3,401,979 | A | 9/1968 | Putsch |

(Continued)

FOREIGN PATENT DOCUMENTS

| DE | 2303289 | A1 | 8/1974 |
| DE | 2402761 | A1 | 6/1975 |
| DE | 3817079 | C2 | 11/1989 |
| DE | 4307563 | A1 | 9/1993 |
| DE | 4436101 | A1 | 6/1995 |
| DE | 10105282 | A1 | 8/2002 |
| DE | 20113973 | U1 | 1/2003 |

(Continued)

OTHER PUBLICATIONS

International Search Report for application No. PCT/EP2010/007160 mailed Mar. 4, 2011.

*Primary Examiner* — Sarah B McPartlin
(74) *Attorney, Agent, or Firm* — Fletcher Yoder, P.C.

(57) ABSTRACT

A vehicle seat, in particular motor vehicle seat, comprises at least one fitting which has two fitting parts rotatable relative to one another, and which defines an axis. At least one structural part has at least one first opening having a first diameter for partially accommodating the fitting, and at least one fastening region surrounding the first opening for fastening the fitting. The fastening region is reinforced relative to the other regions of the structural part by an additional part which has a second opening having a second diameter. The additional part is fixedly connected to the structural part, and the fitting is fixedly connected to the additional part and is at least partially inserted into the second opening.

12 Claims, 3 Drawing Sheets

Figure 4:
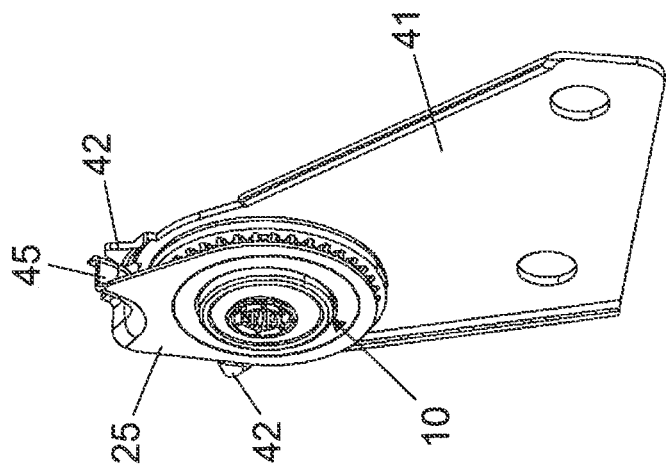

(51) Int. Cl.
  *B60N 2/225* (2006.01)
  *B60N 2/235* (2006.01)
  *B60N 2/68* (2006.01)

(56) References Cited

U.S. PATENT DOCUMENTS

| | | | |
|---|---|---|---|
| 3,731,342 A * | 5/1973 | Cousin | 16/329 |
| 6,378,350 B1 | 4/2002 | Ito | |
| 6,799,806 B2 | 10/2004 | Eppert et al. | |
| 7,387,340 B2 * | 6/2008 | Wilkening | 297/378.12 |

FOREIGN PATENT DOCUMENTS

| | | |
|---|---|---|
| DE | 202005007198 U1 | 9/2005 |
| DE | 102004048350 A1 | 4/2006 |
| DE | 102005051105 A1 | 4/2007 |
| DE | 202006002299 U1 | 6/2007 |
| DE | 102008061691 A1 | 11/2009 |
| DE | 102009005130 A1 | 7/2010 |
| DE | 202009017811 A1 | 7/2010 |
| DE | 102009013881 A1 | 9/2010 |
| JP | 58101316 A | 6/1983 |
| WO | 0044582 A1 | 8/2000 |

* cited by examiner

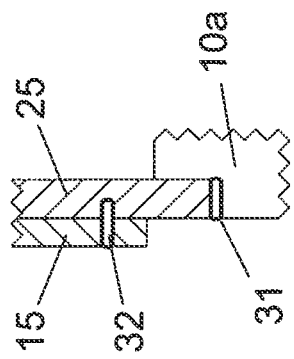
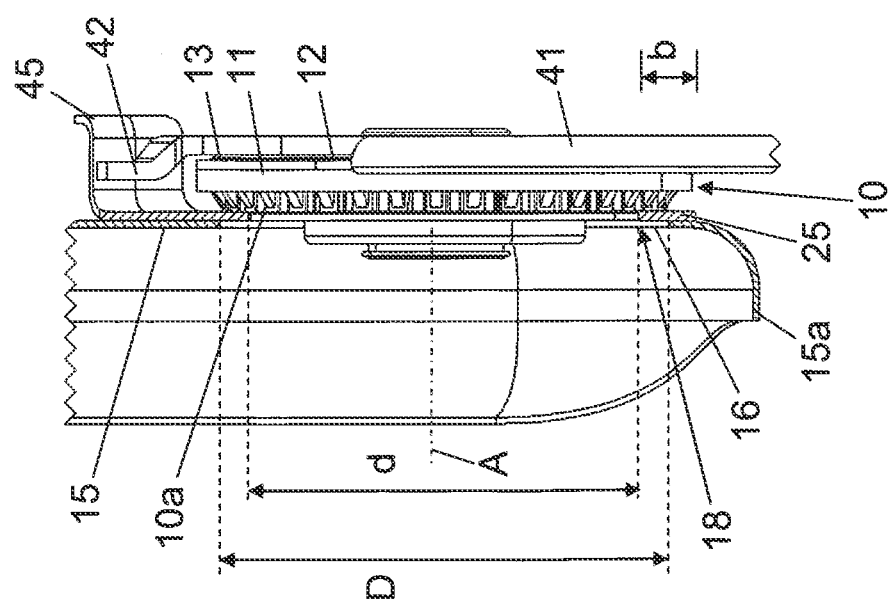

VEHICLE SEAT, IN PARTICULAR MOTOR VEHICLE SEAT

CROSS REFERENCE TO RELATED APPLICATIONS

This application claims priority from and the benefit of PCT Application No. PCT/EP2010/007160, filed on Nov. 25, 2010 and German Patent DE 10 2009 057 928.1, filed on Dec. 9, 2009; both entitled "Vehicle Seat, in Particular Motor Vehicle Seat", which are herein incorporated by reference.

BACKGROUND

The invention relates to a vehicle seat for a motor vehicle. A vehicle seat of this type is disclosed in DE 101 05 282 B4, the fittings thereof which serve as backrest adjusters being fastened to adapters as structural parts. A further vehicle seat of this type is disclosed in DE 20 2005 007 198 U1, the structural part thereof which serves as a backrest side member having a reduced material thickness on the upper end, said material thickness increasing toward the lower end.

SUMMARY

The object of the invention is to improve a vehicle seat of the type mentioned in the introduction. This object is achieved according to the invention by a vehicle seat having at least one fitting which has two fitting parts which are rotatable relative to one another, and which defines an axis. The vehicle seat also includes at least one structural part which has at least one first opening having a first diameter for partially accommodating the at least one fitting and which has at least one fastening region surrounding the first opening for fastening the at least one fitting. The fastening region is reinforced relative to other regions of the structural part by an additional part, the additional part has a second opening having a second diameter, the additional part is formed separately from the structural part and separately from the at least one fitting, the additional part is fixedly connected to the structural part, the at least one fitting is fixedly connected to the additional part and is at least partially inserted into the second opening, and the at least one fitting is not directly connected to the structural part.

The structural part to which the fitting is to be fastened may be any component of the structure of the vehicle seat, for example a backrest side member, a seat frame side part or an adapter, which is specifically configured for connecting the structure to the fitting and is fastened to the structure. The fitting may be any adjuster of the vehicle seat, for example a backrest adjuster or a seat inclination adjuster, optionally also a seat height adjuster. The term "fitting" is, however, also intended to encompass all other possible geared and locking joints and other joints. With regard to the internal construction which is not of significance to the present invention, the fitting may, for example, be a geared fitting or a latching fitting. In order to rotate the two fitting parts relative to one another, the fitting is accordingly driven or unlocked. The invention is suitable, in particular, whenever the external shape of the fitting is a disk shape, which provides few fastening options. The fastening preferably takes place by means of a welded seam, which is intended to be understood as any geometry and type of welding, for example laser weld seams, MAG welding beads or individual resistance weld points.

As the fastening region is reinforced relative to the other regions of the structural part by further material, namely an additional part, the material thickness is only increased over a small area, namely in the fastening region. Relative to a substantially consistently low material thickness, the strength is increased, in particular high torques may be transmitted, whilst weight and costs may be saved relative to a high material thickness which is identical throughout, with comparable strength properties. In particular, in the event of a crash, the forces introduced by the fitting or to be forwarded into the fitting may be absorbed and forwarded in an improved manner. The additional part is formed separately from the structural part and fixedly connected thereto (and to the fitting).

Openings are provided in the structural part and in the additional part, the diameters of said openings being able to be the same or slightly different. The slightly different diameters of the openings facilitate the maintenance of tolerances, by the first opening in the structural part being able to be produced with greater tolerances, and floating tolerance compensation being present as a result of the relative positioning. However, it is desired that the openings with one another and with the axis of the fitting, about which the transmission rod provided between the fittings rotates and about which the fitting parts preferably pivot.

When using the structural part as a backrest side part, by using the additional part according to the invention it is possible to reduce the material thickness of the structural part (and thus the weight), as the thrust forces in the material become lower the greater the distance from the axis (i.e. the pivot axis of the backrest) i.e. a greater diameter of the second welded seam in comparison with the first welded seam. As an alternative to reducing the material thickness, the quality of the material of the structural part may also be reduced. A droplet shape of the additional part permits a specific increase in the reinforcement in the main loading direction. Additionally, further functions may be integrated in the additional part, for example the formation of a stop or the support for a backrest compensation spring.

Insofar as different load classes (and thus different dimensions) exist for the fitting, a correspondingly adapted additional part is sufficient, whilst the structural part may be an identical part.

DRAWINGS

Figure 3:
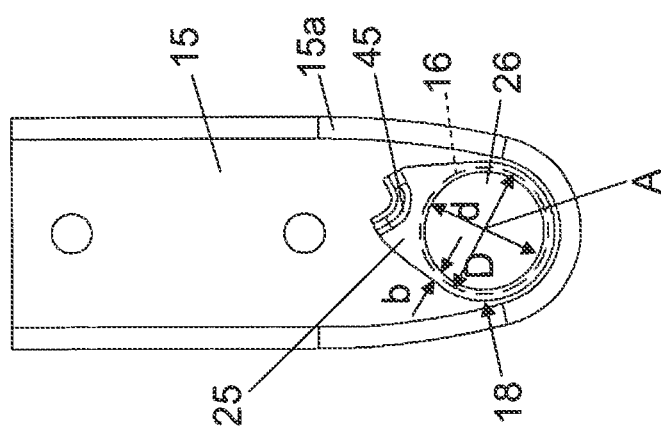
Figure 6:
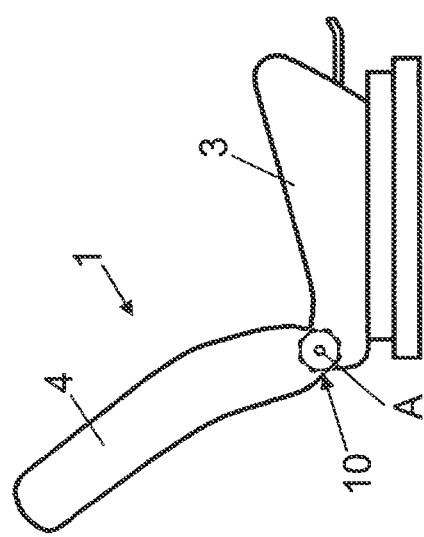
Figure 5:
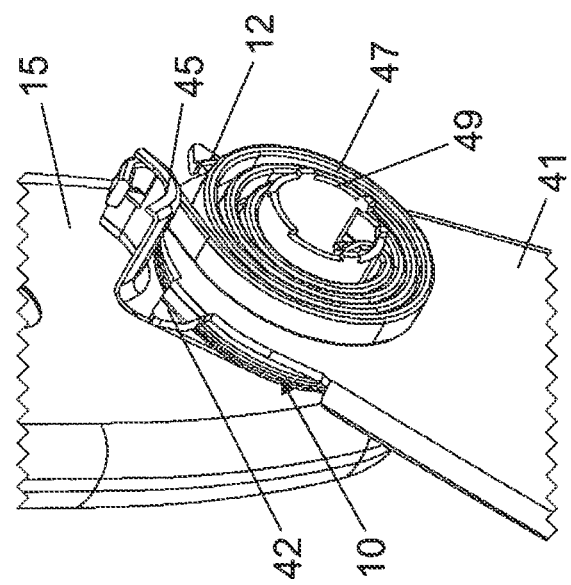

The invention is described in more detail hereinafter with reference to an exemplary embodiment with a modification, shown in the drawings, in which:

FIG. 1 shows a partial sectional view of the fitting, structural part and additional part, FIG. 2 shows an enlarged part of FIG. 1, FIG. 3 shows a side view of the structural part with the additional part, FIG. 4 shows a perspective view of a sub-assembly consisting of the fitting, the additional part and an adapter, FIG. 5 shows a perspective view of a modification, and FIG. 6 shows a schematic side view of a vehicle seat.

DETAILED DESCRIPTION

A vehicle seat 1 for a motor vehicle comprises a seat part 3, a backrest 4 which is attached by means of one respective fitting 10 on both vehicle seat sides to the seat part 3, and which may be adjusted in terms of inclination relative thereto and/or is freely pivotable. In the present case, the fittings 10 are configured as geared fittings with a self-locking eccentric epicyclic gearing, as disclosed in DE 20 2009 017 811 U1 or DE 44 36 101 A1, the relevant disclosure thereof being expressly included in the invention. With regard to its external design, the fittings 10 have a disk shape as is disclosed, for example, in DE 20 2009 017 811 U1 or U.S. Pat. No. 6,799,806 A, the relevant disclosure thereof being expressly included in the invention. Alternatively, the fittings 10 are configured as latching fittings, with the same external design, but an internal design as is disclosed, for example, in WO 00/44582 A1. The internal design of the fittings 10 may, however, deviate from said known fittings. However, it is also possible to combine a single fitting 10 on one vehicle seat side with a joint on the other vehicle seat side.

The two fittings 10 are in a geared connection with one another by means of a profiled transmission rod. The transmission rod is arranged horizontally and transversely to the direction of travel and is rotatable about its own axis A, the exact position thereof being defined by the fittings 10. A hand wheel (or hand lever) located fixedly in terms of rotation on the transmission rod, serves for manual actuation of the fittings 10. In the case of geared fittings, a motorized actuation is also possible. The following directional information refers to the cylindrical coordinate system which is defined by the axis A.

Each fitting 10 comprises a first fitting part 11 and a second fitting part 12 which may be rotated relative to one another, by the rotation of the transmission rod driving (in the case of the geared fitting) or unlocking (in the case of the latching fitting) the fitting 10. The two fitting parts 11 and 12 in each case may describe an approximately circular disk shape. For receiving the axially acting forces, i.e. for holding the fitting parts 11 and 12 axially together, a clasping ring 13 is provided. In terms of structure, therefore, the two fitting parts 11 and 12, together form (with the clasping ring 13) a disk-shaped unit.

The disk shape provides the advantage of a compact design but, precisely for this reason and namely due to the small surfaces available, sets specific requirements for the technology for attaching the fitting to the structures of the seat part 3 and backrest 4. The attachment of the fitting 10 to a structural part 15 is described by way of example, said structural part being an integral partial region of the structure of the backrest 4.

On the structural part 15 a first—at least approximately circular cylindrical—opening 16 is formed, said opening being surrounded in an annular manner (or arcuate manner) by a fastening region 18. The first opening 16 may also have a different geometry, for example a star shape or a different shape with cyclic symmetry relative to the axis A. For forming the opening 16, starting from a metal sheet in a preparation step, a blank for the structural part 15 is stamped out and optionally the external edge 15a of the structural part 15 is produced, for example an edge bent-back—potentially in the same operation—by approximately 90°. At the same time or in a subsequent step, a central region is stamped out as a first opening 16 within a substantially planar circular region which may be raised in the same direction as the external edge 15a (by, for example, two material thicknesses). The annular shape (or arcuate shape) of the fastening region 18 defines a radial width b (for example 4 mm) which is markedly smaller than the first diameter D (for example 60 mm) of the first opening 16. For geometries of the first opening 16 which deviate from the circular shape, the first diameter D should be that of the circle with the same surface area.

The structural part 15 may also be an integral partial region of the structure of the seat part 3 or a separate adapter connected to the structure of the backrest 4 or the seat part 3. The application of the invention is not limited to the connection of a fitting 10 to the seat part 3 and backrest 4. Instead, it may be applied to all ways of connecting fittings and components to structural assemblies known to the person skilled in the art. Thus, for example, a fitting for a seat height adjuster may be attached in the same manner as is disclosed in DE 10 3209 008 576 A1.

For producing an optimized connection between the structural part 15 and the fitting 10 in the fastening region 18 further material is accumulated relative to the remaining regions of the structural part 15 in order to reinforce the structural part 15 in the local surroundings of the fitting 10. In the present case, the additional material originates from an additional part 25 which is formed separately with a second opening 26 and is preferably stamped out from the same metal sheet. The resulting fastening region 18, i.e. the additional part 25 and the region of the structural part 15 covered thereby, for example has double the material thickness of the structural part 15. The additional part 25 preferably has a droplet shape (with a pointed end and a blunt end), wherein the pointed end faces upward and the part of the fastening region 18 which is subjected to greater loads is reinforced. The radially protruding region of the additional part 25 which comprises the pointed end, is not taken into consideration when defining the width b of the fastening region 18. The additional part 25 may alternatively be configured in an annular manner. Generally, by adapting the geometry of the additional part 25 it is possible to reinforce the structural part 15 specifically in the critical part of the fastening region 18. Thus it is possible to avoid expensive semi-finished products, for example tailored blanks.

The second opening 26 of the additional part 25 preferably has the same geometry as the first opening 16 of the structural part 15. The second opening 26 has a second diameter d. For geometries of the second opening 26 which deviate from the circular shape, the second diameter d should be that of the circle with the same surface area. The second diameter d (for example 52 mm) of the second opening 26 according to the invention is smaller than the first diameter D of the first opening 16. The "smaller" additional part 25 and its second opening 26 may be configured with better tolerances than the first opening 16 in the "larger" structural part 15. Due to its greater diameter D, therefore, the first opening 16 may also be slightly offset relative to the axis A and/or be formed with a slightly deviating diameter. The additional part 25 is positioned on the structural part 15 sufficiently precisely (floating tolerance compensation) that the second opening 26 is aligned (or will be aligned) with the axis A—and depending on the tolerance position also with the first opening 16. In the projection, the first opening 16 preferably fully encompasses the second opening 26. The structural part 15 is able to be produced more cost-effectively with the greater tolerances.

The fitting 10 is positioned on the additional part 25 with a front face comprising a shoulder 10a, in the present case with the front face of the first fitting part 11 remote from the second fitting part 12, wherein the shoulder 10a is inserted into the second opening 26 and the fitting 10 bears with the part of its front face surrounding the shoulder 10a on the additional part 25. Preferably, the second opening 26 then positively receives the shoulder 10a. The first opening 16 at least partially receives the fitting 10.

In principle, several equivalent mounting sequences are conceivable. In the first sequence, the fitting 10 is positioned on the loose additional part 25 (or vice-versa), by the first fitting part 11 being inserted with the shoulder 10a into the second opening 26. Then the fitting 10 and the additional part 25 are fixedly connected together by means of a first welded seam 31. The first welded seam 31 for the fitting 10, which is relevant in terms of safety, may be produced on standard welding systems. The resulting sub-assembly is optimally suitable for transportation, as the dimensions permit accurate nesting. Subsequently, this sub-assembly is positioned on the structural part 15, and then the additional part 25 is fixedly connected to the structural part 15 by means of a second welded seam 32. As an alternative to the welding, a further connection is conceivable, for example, by screwing-on or attaching the structural part 15 and, for example, consisting of other materials.

In the second sequence, the additional part 25 is positioned on the structural part 15 and fixedly connected thereto by means of the second welded seam 32. Subsequently, the fitting 10 is positioned on said sub-assembly, by the first fitting part 11 being inserted with the shoulder 10a into the second opening 26. Then the fitting 10 and the additional part 25 are fixedly connected together by means of the first welded seam 31. In a modification thereof, the structural part 15 and the additional part 25 may be initially fixed by means of clinching, which may be incorporated in the stamping process and subsequently (after or at the same time as the first welded seam 31) supplemented by the second welded seam 32. In the third sequence, the fitting 10, the additional part 25 and the structural part 15 are positioned relative to one another and then fixedly connected together by the welded seams 31 and 32. Instead of the welding, the fitting 10 may also be fixedly connected in a different manner (i.e. captively) to the fastening region 18, i.e. the additional part 25 and the region of the structural part 15 covered by the additional part 25.

The welded seams 31 and 32 are preferably produced by laser welding. The welded seams 31 and 32, may also be produced by other types of welding, such as MAG-welding. They may be circular, circular arc-shaped, in the form of points or of another geometry. The additional part 25, which is stamped more accurately due to its simpler geometry, permits close-joint welding which is a more reliable process. The side part 15 is attached to the additional part 25 by means of through-welding. As a result, it is possible to compensate for tolerances in the connecting plane. The arrangement of the components to be welded together is selected such that the structural part 15 covers the functional surfaces of the fitting 10, which do not necessarily need to be covered by the weld. The second welded seam 32 in the present case is not directly positioned on the fitting 10, so that it may be produced particularly easily by (cost-effective) MAG welding, in particular when it is produced at a different manufacturing location from the first welded seam 31. In an alternative arrangement, the second welded seam 32 may be configured to be sufficiently deep that it reaches as far as the fitting 10 and thus in addition to (or instead of) the first welded seam 31 fastens the fitting 10 to the structural part 15.

The method steps do not have to take place in individual production steps and/or tools. Depending on the design of tool, a plurality of method steps may be implemented in one production step and/or tool.

Optionally further functions may be integrated in the additional part 25—apart from reinforcing the structural part 15 in the fastening region 18 and the attachment of the fitting 10. Additional components are thus not necessary. A modular solution may be implemented by simply extending the geometry of the additional part 25.

An adapter 41 is fastened to the fitting part 11 or 12 of the fitting 10 remote from the additional part 25, in this case the second fitting part 12, the fitting 10 being connected in this case to the structure of the seat part 3 by means of said adapter. Preferably, two limit stops 42 are formed on said adapter 41, said limit stops protruding radially from the adapter 41 relative to the axis A. On the additional part 25, a projection 45 is preferably formed, preferably on the pointed end of the droplet shape, by said pointed end being bent-back relative to the axis A in the axial direction (so that the pointed end is only approximately pointed) and protrudes as far as the plane of the adapter 41 with its limit stops 42. The projection 45 is arranged in the peripheral direction of the axis A between the two limit stops 42. By the cooperation of the projection 45 which functions as a stop and the limit stops 42, the pivoting range of the backrest 4 for the inclination adjustment is limited. The path of the flux of force of the load on the stop is very short. The tolerances of the stop position may be adjusted very accurately when the second opening 16 is circular and, as a result, permits angular compensation before the welding process.

The projection 45 of the additional part 25 may be configured additionally or alternatively as a support for a backrest compensation spring 47, as the modification in FIG. 5 shows. The backrest compensation spring 47 is used, in particular, when the fitting 10 is configured as a latching fitting, in order to compensate at least partially for the weight of the backrest 4 when the fitting 10 is unlocked. In theory, the backrest compensation spring 47 may, however, also be used in a geared fitting. Preferably, the backrest compensation spring 47 is configured as a spiral spring, which is supported with pretensioning radially on the outside on the projection 45 and radially on the inside on a bushing 49. Said bushing 49 may be fastened to the second fitting part 12 and/or to the adapter 41.

The invention claimed is:

1. A vehicle seat for a motor vehicle, comprising:
at least one fitting which has two fitting parts which are rotatable relative to one another, and which defines an axis; and
at least one structural part which has at least one first opening having a first diameter for partially accommodating the at least one fitting and which has at least one fastening region surrounding the first opening for fastening the at least one fitting;
wherein the fastening region is reinforced relative to other regions of the structural part by an additional part, the additional part has a second opening having a second diameter, the additional part is formed separately from the structural part and separately from the at least one fitting, the additional part is fixedly connected to the structural part, the at least one fitting is fixedly connected to the additional part and is at least partially inserted into the second opening, and the at least one fitting is not directly connected to the structural part.

2. The vehicle seat as claimed in claim 1, wherein the diameter of the second opening is smaller than the diameter of the first opening.

3. The vehicle seat as claimed in claim 1, wherein the second opening is aligned with the axis.

4. The vehicle seat as claimed in claim 1, wherein the first opening fully encompasses the second opening.

5. The vehicle seat as claimed in claim 4, wherein the first opening is aligned with the axis.

6. The vehicle seat as claimed in claim 1, wherein the at least one fitting comprises on one of the two fitting parts a shoulder which is arranged at least inside the second opening.

7. The vehicle seat as claimed in claim 1, wherein the at least one fitting is fixedly connected by at least one first welded seam to the additional part.

8. The vehicle seat as claimed in claim 1, wherein the additional part is fixedly connected to the structural part by at least one second welded seam.

9. The vehicle seat as claimed in claim 1, wherein the additional part has a droplet shape with an at least approximately pointed end and a blunt end.

10. The vehicle seat as claimed in claim 1, wherein the additional part has a projection protruding axially relative to the axis.

11. The vehicle seat as claimed in claim 10, wherein the projection is configured as a stop to cooperate with limit stops and/or as a support for a backrest compensation spring.

12. The vehicle seat as claimed in claim 10, wherein the projection at an at least approximately pointed end of the additional part has a droplet shape.

\* \* \* \* \*